June 18, 1963     W. WYSOCKI     3,094,635
LINEAR MOTION GENERATOR TRANSDUCER SIGNAL
Filed Nov. 24, 1958
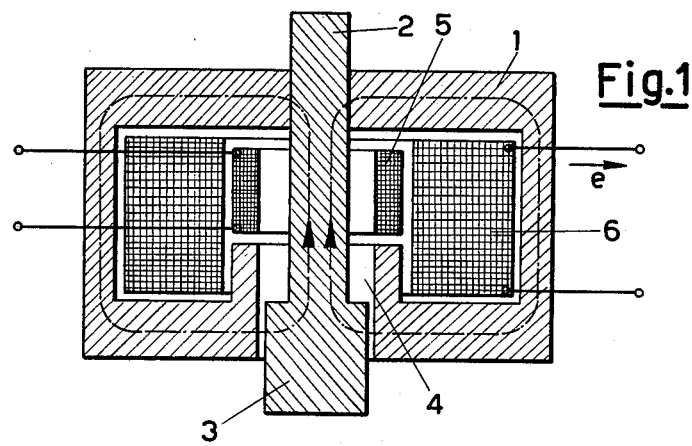
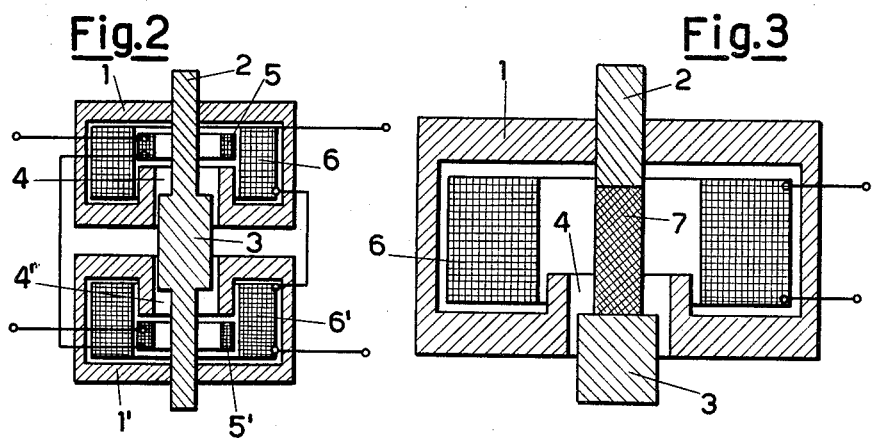
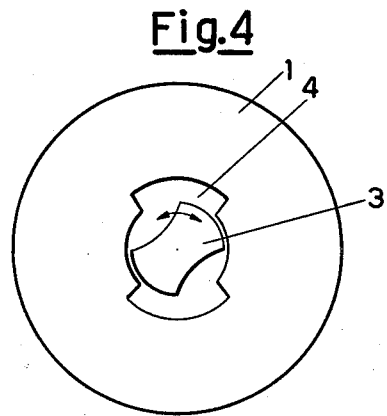
Inventor.
Waclaw Wysocki
By: [signature]
Attorney

United States Patent Office 3,094,635
Patented June 18, 1963

3,094,635
LINEAR MOTION GENERATOR TRANSDUCER SIGNAL
Waclaw Wysocki, Milan, Italy, assignor to Costruzioni Meccaniche Riva S.p.A., Milan, Italy, a company of Italy
Filed Nov. 24, 1958, Ser. No. 781,178
Claims priority, application Italy Dec. 21, 1957
3 Claims. (Cl. 310—12)

It is an object of the present invention to provide an electromagnetic device adapted to translate the speed of displacement of a mechanical member into an electric signal. Devices of that kind find application in electrical control installations, governors, servomechanisms, etc., in which the electric signal proportional to the speed of displacement of a mechanical member usually serves as an auxiliary function employed to attain determined characteristics of operation of the installation.

There are already known and utilized for that purpose various devices which, however, afford inconveniences particularly in those applications in which the mechanical member has to effect comparatively very slow movements and with very variable speeds which require at the same time maximum safety in operation without maintenance and wherein there are not admissible any elements subject to undergoing wear and requiring periodical replacement. The problem will be better illustrated with reference to some typical example.

Some of the conventional devices are constituted by passive elements. With them, firstly a voltage is obtained proportional to the position of the mobile members, for instance from a potentiometer, passed through by a constant direct current and the brush of which is connected to said mobile member, then the voltage obtained is differentiated by means of any conventional electric differentiators.

A simple resistance-and-capacity differentiator may be too cumbersome and costly in the case in which the displacements of the mechanical member are very slow; and the said differentiation may be unsatisfactory if the mechanical mobile member has to displace with speeds very different from one another. To remedy that one must resort to more complicated and delicate circuits employing electron tubes which must be periodically checked (inspected) and replaced, and which may cause breakdown.

In addition to those inconveniences and complications, the electric differentiator is not well adapted for the direct piloting of devices having low input impedance, and this constitutes a considerable limitation to application in practice.

Moreover, it should be borne in mind that the use of sliding brushes following the movements of the mechanical member is disadvantageous since the brushes are subject to heavy wear so as to require continuous supervision and maintainance servicing.

The electric sliding contact may be subject to oxidation especially in the case of application in moist places or any corrosive atmosphere, or if the device is destined to remain still for long period of time, whence the existence of said sliding electric contacts may prejudice the safety of operation of the installation.

Another known device consists in a direct current rotary generator actuated by the translatory movement of a mobile member as for instance transmitted by a rack or the like. The average value of the electromotive force generated is proportional to the speed of displacement of the mechanical member. This device is sturdier as compared with the one previously described but this device too contains sliding brushes which involve the inconveniences noted above and in addition its application is limited to the cases in which the current delivered is a pulsating current and if the perturbations due to the switching-over of the commutator do not cause disturbance.

There are also known devices free from the principal defects of the kinds above described and free from sliding electric contacts. The signal is obtained with them from a mobile coil placed in the gap of a fixed magnet and connected to the mechanical mobile member in such a manner that the displacements of the coil are proportional to those of said mechanical member. The electromotive force generated by the movable coil has amplitude proportional at any time to the speed of displacement of the mechanical member and polarity relative to the direction of displacement.

This device, however, can generate only signals of low power, specially in cases in which the displacements are achieved very slowly. If a comparatively high output power is requested and if at the same time the speeds of displacements are very slow, and if size is to be contained within industrially admissible limits, it becomes necessary to use an electronic amplifiers, which involves the inconveniences and limitations previously described. Moreover, the device contains flexible electric connections which require the use of particular constructive contrivances to attain safety of operation.

It is an object of the present invention to provide an electromagnetic device adapted to translate the speed of displacement of a mechanical member into an electric signal and not affording the inconveniences and limitations of the devices known and used heretofore.

This object is attained according to the invention by means of a device comprising at least one fixed magnet provided with a gap, with a fixed armature coil or output coil arranged in such a manner that the magnetic flux generated by the magnet is linked therewith and with a magnetic core movable with respect to the magnet and housed in the gap thereof in such a manner that its displacement varies the magnitude of the gap and therefore varies the reluctance of the magnetic circuit, thereby causing the variation of the linkage with the armature coil in which there is induced an electro-motive force, the amplitude of which is at any time a function of the speed of displacement of the mobile core and the sign of which depends on the direction of the displacement.

In a particular case the magnet may be constituted by an electro-magnet with a field coil fed by direct current. From the mechanical point of view the device according to the invention appears to be particularly sturdy, it does not contain any electric components subject to wear or requiring replacement; and it is of simple construction. In particular it does not possess either any movable coils with relatively flexible connections or any sliding brushes that might display the inconveniences already described.

The only movable member is the mobile magnetic core which has sturdiness and a lifetime equal to that of any mechanical member in movement; and its construction does not involve any particular problem.

As for electric characteristics, the device according to the invention is also free from the defects and limitations hereinbefore described. The generated signal is free from alternate components extraneous to the magnitude to be governed. The output power can be considerable, although keeping size comparatively small, in such a way that in practice there is not required the use of an electronic amplifier, even if movement should be very slow.

The device is a grenerator and, therefore, it is free from the inconveniences of differentiators with passive circuits as due to the accumulation of reactive energy; the transients extraneous to the magnitude measured are quite negligible in practice.

There is no limitation for the load impedance, which may be indifferently of low or high resistance; in particular the device is well suited for the direct piloting of magnetic amplifiers. Some examples of practical embodiments of the device according to the invention are diagrammatically illustrated in the accompanyinging drawings for the purpose of making the principles set forth hereinbefore more fully understood.

FIG. 1 shows a diagram illustrating the principle of the device in the case in which an electromagnet having a movable core is used.

FIG. 2 represents an embodiment in which two devices like that of FIG. 1 are connected in opposition.

FIG. 3 represents diagrammatically the case in which the magneto-motive force is supplied by a permanent magnet.

FIG. 4 illustrates a device according to the invention and adapted as a transducer of speeds of angular displacements of a mechanical member.

With reference to FIG. 1, the device comprises a cylindrical core 1 constituted of magnetic material, a movable core 2 which too is of magnetic material and has a shaped portion 3 adapted to move with translatory movement within the gap 4 of the fixed core 1 to vary the said gap and, therewith, the reluctance of the magnetic circuit.

The movable core 2 is connected in any manner suitable with the mechanical member (not shown), the speed of displacement of which is to be translated into an electric signal.

Within the fixed core 1 there are housed two coils: the field coil 5 fed by direct current and the armature or output coil 6.

The direct current circulating in the field coil 5 generates the magnetic flux which flows through the fixed core and passes through the gap 4 and the mobile core, as indicated in FIG. 1.

The armature or output coil 6 is accommodated in the fixed core in such a manner that the magnetic flux becomes linked therewith.

If the magnetomotive force as supplied by the field coil remains constant, the flux varies according to the reluctance of the magnetic circuit, that is to say, it varies with the varying of the position of the mobile core, hence in the output coil there is induced an electromotive force of amplitude proportional at any time to the speed of displacement of the mobile core, and the sign whereof depends on the direction of displacement of the mobile core:

$$e \equiv \frac{ds}{dt}$$

where $s$ is the stroke, $t$ is the time and $e$ is the induced electromotive force.

FIG. 2 illustrates the case in which two devices like that of FIG. 1 are connected in opposition.

Same reference numerals are used for equal or analogous parts.

As can be seen, in this case one single mobile core 2 with its central part 3 profiled, varies, in displacing itself, contemporaneously and in opposed direction, the gaps 4 and 4' of the respective fixed cores 1 and 1'.

The field coils 5 and 5' are connected with one another in series in such a way that the fluxes in the two fixed cores have the same direction (plus or minus).

The armature or output coils 6 and 6' are connected in series and in opposition, hence the electromotive forces generated in the two coils appear with the same signs at the output terminals.

In that way there are attained the well-known advantages of systems in opposition, dispersed fluxes are reduced, and the protection from the influence of any extraneous ferromagnetic masses is obtained. Moreover it is possible to obtain, by adopting simple constructive contrivances, a proof embodiment of the device.

FIG. 3 represents an embodiment of the device according to the invention in which in lieu of a field coil there is provided a permanent magnet. As visible in said figure the device has again a fixed core 1 and a mobile core 2 with its shaped portion 3 displaceable in the gap of the core 1. In the stem of the mobile core 2 there is inserted the permanent magnet 7 which generates the magnetic field. In the output coil 6 there is created as in the preceding cases an electromotive force proportional to the variation of the linkage in time.

It is obvious that this embodiment is applicable also in the case of two devices connected in opposition (as in FIG. 2).

The embodiments described hereinbefore serve to translate the speed of translatory displacement of a mechanical member into an electric signal. The device diagrammatically illustrated in FIG. 4 instead shows a solution adapted to translate the speed of angular displacement of a mechanical member into an electric signal.

In that case, see the diagrammatical view in FIG. 4 from bottom, both the shoe (extension) 3 of the mobile core, which now is able to turn around its axis in lieu of translatory movement along said axis, and the adjacent part of the gap 4 of the fixed core 1 should be conveniently profiled. The angular displacements of the mobile core vary the reluctance of the magnetic circuit as in the first cases, as a consequence of a translatory movement of the mobile core.

At the output of the armature coil there is obtained a signal proportional to the speed of angular displacement.

$$e \equiv \frac{d\phi}{dt}$$

where $\phi$ is the angle described by the mobile core.

The above solution can be adopted obviously also in the case of two devices connected in opposition as well as in the case in which the energising is by means of a permanent magnet.

Moreover it is obvious that the fixed core may have any convenient shape different from the cylindrical shape indicated by way of example in the embodiments illustrated above.

I claim:
1. An electromechanical transducer comprising a generally cylindrical housing of magnetic material having end walls, an electrical output coil within said housing, each one of said end walls having a central opening, one of said openings being larger than the other one thereof, an armature of magnetic material extending centrally through said housing and having a relatively narrow portion closely fitted and slidable in the smaller one of said openings, said armature having a relatively wide end portion loosely fitted in the larger one of said openings and approximately equal in length to the length of said larger opening as taken in the direction of the length of the housing, the space in said larger opening between the end wall thereof and said armature defining a gap in the magnetic flux path through said housing and said armature, said larger opening and said wide end portion of said armature being shaped so that relative motion of said armature along a predetermined coordinate direction varies the reluctance of said gap, and means for producing a substantially constant magnetomotive force in said flux path, whereby relative motion of said armature in said predetermined direction produces an output electrical signal in said coil due to a change in flux in said flux path brought about by a change in the reluctance of said gap.

2. An electromechanical transducer comprising a generally cylindrical housing of magnetic material having end walls, an electrical output coil within said housing, each one of said end walls having a central opening, one of said openings being larger than the other one thereof, an armature of magnetic material extending centrally through said housing and having a relatively narrow portion closely fitted and slidable in the smaller one of said openings, said armature having a relatively wide end portion loosely fitted in the larger one of said openings and approximately equal in length to the length of said larger opening as taken in the direction of the length of the housing, the space in said larger opening between the end wall thereof and said armature defining a gap in the magnetic flux path through said housing and said armature, said larger opening and said wide end portion of said armature being shaped so that relative motion of said armature along a predetermined coordinate direction varies the reluctance of said gap, and an energizing coil within said housing coaxially around said armature for connection to a constant current source for producing a substantially constant magnetomotive force in said flux path, said output coil being relatively large as compared to said energizing coil and occupying a relatively large part of the space within said housing, whereby a relatively large output signal is produced across said output coil in response to flux changes brought about by changes in the reluctance of said gap due to relative movement of said armature.

3. An electromechanical transducer comprising a generally cylindrical housing of magnetic material having end walls, an electrical output coil within said housing, each one of said end walls having a central opening, one of said openings being larger than the other one thereof, an armature of magnetic material extending centrally through said housing and having a relatively narrow portion closely fitted and slidable in the smaller one of said openings, said armature having a relatively wide end portion loosely fitted in the larger one of said openings and approximately equal in length to the length of said larger opening as taken in the direction of the length of the housing, the space in said larger opening between the end wall thereof and said armature defining a gap in the magnetic flux path through said housing and said armature, said larger opening and said wide end portion of said armature being shaped so that relative motion of said armature along a predetermined coordinate direction varies the reluctance of said gap, said armature including a permanent magnet oriented lengthwise of said armature for producing a substantially constant magnetomotive force in said flux path, said output coil being relatively large and occupying a relatively large part of the space upon said housing, whereby a relatively large output signal is produced across said output coil in response to flux changes brought about by changes in the reluctance of said gap due to relative movement of said armature.

References Cited in the file of this patent

UNITED STATES PATENTS

| | | |
|---|---|---|
| 2,570,693 | Koonz | Oct. 9, 1951 |
| 2,740,946 | Geneslay | Apr. 3, 1956 |
| 2,753,176 | List | July 3, 1956 |
| 2,820,915 | Matthews | Jan. 21, 1958 |
| 2,842,688 | Martin | July 8, 1958 |